Patented Apr. 27, 1937

2,078,527

UNITED STATES PATENT OFFICE 2,078,527

RUBBER COMPOUND AND METHOD OF PRESERVING IT

Albert M. Clifford, Stow, Ohio, assignor to Wingfoot Corporation, Wilmington, Del., a corporation of Delaware No Drawing. Application July 28, 1932, Serial No. 625,528

22 Claims. (Cl. 18—50)

The present invention relates to a process for manufacturing vulcanized rubber products and to the products obtained thereby. It is more particularly directed to a process for vulcanizing rubber wherein there is incorporated in the rubber mix prior to vulcanization a compound of the type hereinafter disclosed whereby antioxidant or age resisting properties are developed in the vulcanized rubber product. The invention will be understood from the following description and examples wherein a preferred mode of operating the invention is fully set forth and described.

It is well known to those skilled in the art of rubber compounding that many rubber compounds and particularly those cured in the presence of certain vulcanization accelerators, such, for example as diphenyl guanidine, possess relatively poor ageing qualities; that is, the vulcanized rubber product deteriorates rapidly when exposed to air, heat and sunlight. Such deterioration exhibits itself by a loss in the tensile strength, resiliency and other desirable properties of the material.

The age resisting characteristics of a vulcanized rubber product can be readily ascertained by subjecting samples of the vulcanized product to an accelerated ageing test in a bomb, where, exposed to the action of oxygen, they are maintained for several hours at elevated temperatures and pressures. The treated samples are then tested and the results compared with similar results obtained by testing the unaged vulcanized stock. The deterioration in properties suffered as a result of the oxidation treatment is indicative of the result that would normally be expected from that particular stock during service. One such test is known as the Bierer-Davis ageing test and produces an effect on a vulcanized rubber stock comparable to that resulting from several years of natural ageing of the rubber.

According to the present invention, a new class of antioxidants has been found which, upon incorporation in rubber, imparts desirable age resisting qualities to the vulcanized stock. Samples thereof, when subjected to the artificial ageing tests herein described, experience only a very small loss in tensile strength and other qualities. The compounds herein disclosed, imparting such desirable antioxidant characteristics to vulcanized rubber, comprise N—N' diaryl arylene diamines. In these compounds, the aryl radicals are of single ring of condensed polynuclear construction, i. e., radicals wherein rings which are directly connected to each other by carbon atoms have two such atoms common to each two of the rings so connected, at least one of the aryl groups in each compound being of such condensed polynuclear construction. These condensed polynuclear aryl groups include the substituted and unclear aryl groups include the substituted and unsubstituted naphthyl, anthracyl, indene, fluorene, phenanthryl and acenaphthene groups. They may be substituted by alkyl and/or hydroxy and/or amino and/or halogen and/or oxygen and/or alkoxy and/or aryloxy groups.

The following are typical members of the class of compounds to which the invention relates di-beta naphthyl m-phenylene diamine, di-alpha naphthyl p-tolylene diamine, dinaphthyl p-chloro m-phenylene diamine, dinaphthyl p-hydroxy m-phenylene diamine, dinaphthyl p-amino m-phenylene diamine, ethyl phenyl phenyl phenylene diamine, dinaphthyl p-methoxy m-phenylene diamine, dinaphthyl p-ethoxy m-phenylene diamine, di (4-4' ethyl phenyl) phenylene diamine, di ortho tolyl phenylene diamine, di ortho para tolyl phenylene diamine, di para tolyl phenylene diamine, 4-4' di tolyl p-chloro m-phenylene diamine, 4-4' di tolyl p-amino m-phenylene diamine, 4-4' di tolyl p-hydroxy m-phenylene diamine, 4-4' di tolyl p-ethoxy m-phenylene diamine, di xylyl p-phenylene diamine, di xylyl tolylene diamine, di tolyl tolylene diamine, di xylyl m-chlor p-phenylene diamine, di (m-chlor-p-tolyl) tolylene diamine, phenyl tolyl phenylene diamine, phenyl xylyl phenylene diamine, tolyl xylyl phenylene diamine, phenyl tolyl tolylene diamine, phenyl xylyl tolylene diamine, tolyl xylyl tolylene diamine.

Also, phenyl beta naphthyl phenylene diamine, xylyl tolyl alpha naphthyl phenylene diamine, xylyl naphthyl phenylene diamine, phenyl alpha naphthyl tolylene diamine, phenyl beta naphthyl tolylene diamine, tolyl naphthyl tolylene diamine, xylyl naphthyl tolylene diamine, diphenyl xylylene diamine, ditolyl xylylene diamine, dinaphthyl xylylene diamine, diphenyl naphthylene diamine, di (p-hydroxy phenyl) naphthylene diamine, di (p-chlor phenyl) naphthylene diamine, di (p-amino phenyl) naphthylene diamine, di p-tolyl naphthylene diamine, di o-tolyl naphthylene diamine, di xylyl naphthylene diamine, phenyl xylyl naphthylene diamine, phenyl xylyl naphthylene diamine, tolyl xylyl naphthylene diamine, 2-5-dianilino hydroquinone, 2-5-di (p-tolyl amino) hydroquinone, di (p-hydroxy phenyl) tolylene diamine, 2-4-di (phenyl amino) 1-naphthol; p-hydroxy m-tolyl phenyl phenylene diamine, 2-4-dianilino naphthalene; dianilino quinone anilid; phenanthryl phenyl phenylene diamine, having the formula

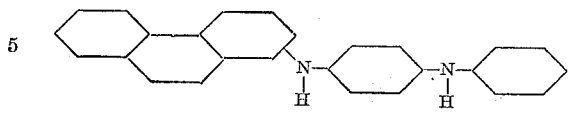

phenanthryl para tolyl phenylene diamine; acenaphthyl phenyl phenylene diamine, having the formula

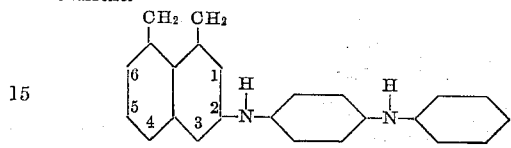

and acenaphthyl para tolyl phenylene diamine.

Illustrating the preparation of dibeta naphthyl m-phenylene diamine and like compounds, approximately molar quantities of beta naphthol and meta phenylene diamine are heated in a closed vessel with one half mol. of anhydrous calcium chloride for a period of from five to eight hours at a temperature of approximately 270 degrees C. A black reaction product of tarry nature is obtained, having a melting point of approximately 100 degrees C. This tarry material is believed to consist of two reaction products; namely, unsymmetrical mono beta naphthyl meta phenylene diamine and symmetrical dibeta naphthyl meta phenylene diamine. These compounds may be separated by fractional crystallization from suitable solvents. The reactions involved may be represented as follows:

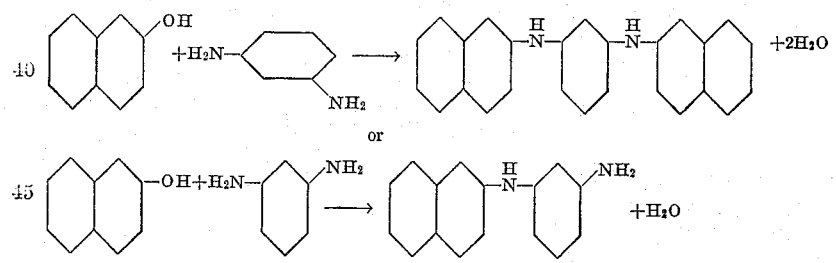

Illustrative of the preparation of such compounds as di p-tolyl phenylene diamine, two mols of p-acet toluidide may be refluxed with one mol. of para dibrom benzene in the presence of potassium carbonate and metallic copper at a temperature ranging from 180 to 240 degrees C. By treating the product with two mols of sodium hydroxide, the di p-tolyl phenylene diamine separates out. The reactions involved are illustrated by the following equations:

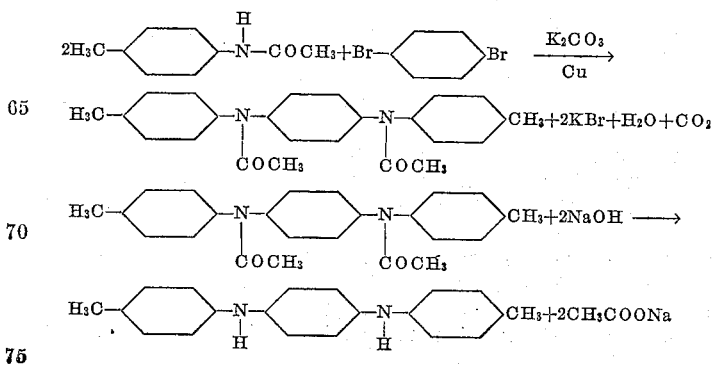

Any one or a mixture of several of the above enumerated substances or of these substances with other known antioxidants may be incorporated in rubber with good effect on its age resisting properties. For example, from 0.25 to 5.0% of such an antioxidant may be mixed with the rubber before vulcanization, the preferred antioxidants having substantially no accelerating effect and therefore ordinarily not necessitating an adjustment of vulcanizing conditions. Alternately, the antioxidant may be applied to the surface of crude or vulcanized rubber, say in the form of a powder, paste, or solution. Rubber so treated resists the deteriorating influence of age and exposure to the elements far better than untreated rubber.

A preferred method of practicing the invention involves employing the compounds above indicated in the following formula:

|  | Parts |
|---|---|
| Rubber | 100 |
| Sulfur | 3 |
| Hexamethylene tetramine | 1 |
| Stearic acid | 1.5 |
| Zinc oxide | 5 |
| Antioxidant | 1 |

Samples of rubber prepared in accordance with the preceding formula, in which the new compounds were employed as antioxidants, were subjected to varying degrees of vulcanization. One set of the vulcanized samples was subjected to physical tests in order to ascertain its tensile strength and elasticity before ageing. A second set of samples was first weighed to ascertain the weight of each sample before oxidation, after which the samples were placed in an oxygen bomb and subjected to rapid ageing at a temperature of 50 degrees C. and 100 pounds oxygen pressure per square inch for a period of six days. These were then removed and weighed to ascertain the percent of oxygen absorbed during this treatment. The aged samples were next subjected to physical tests similar to those conducted upon the first group of samples. The comparative results of the tests are tabulated as follows:

2-4-dianilino-1-naphthol

Original

| Cure in mins. | Steam pressure pounds per square inch | Load in kgs/cm² at 500% elong. | Load in kgs/cm² at 700% elong. | Load in kgs/cm² at Break | Percent elong. at break | Percent weight increase |
|---|---|---|---|---|---|---|
| 30 | 40 | 12 | 45 | 118 | 920 | --------- |
| 50 | 40 | 20 | 66 | 142 | 830 | --------- |
| 70 | 40 | 26 | 98 | 156 | 775 | --------- |

After ageing

| | | | | | | |
|---|---|---|---|---|---|---|
| 30 | 40 | 15 | 47 | 88 | 820 | .05 |
| 50 | 40 | 22 | 74 | 121 | 785 | .08 |
| 70 | 40 | 33 | 122 | 136 | 720 | .22 |

Di-p-tolyl-p-phenylene diamine

Original

| | | | | | | |
|---|---|---|---|---|---|---|
| 35 | 40 | 12 | 33 | 95 | 895 | --------- |
| 50 | 40 | 18 | 58 | 124 | 825 | --------- |
| 70 | 40 | 21 | 74 | 139 | 805 | --------- |

After ageing

| | | | | | | |
|---|---|---|---|---|---|---|
| 35 | 40 | 14 | 45 | 104 | 840 | .06 |
| 50 | 40 | 21 | 80 | 129 | 780 | .12 |
| 70 | 40 | 25 | 94 | 138 | 765 | .11 |

Di-o-tolyl-p-phenylene diamine

Original

| | | | | | | |
|---|---|---|---|---|---|---|
| 35 | 40 | 12 | 34 | 88 | 875 | --------- |
| 50 | 40 | 17 | 56 | 128 | 840 | --------- |
| 70 | 40 | 21 | 75 | 139 | 805 | --------- |

After ageing

| | | | | | | |
|---|---|---|---|---|---|---|
| 35 | 40 | 14 | 47 | 116 | 855 | .02 |
| 50 | 40 | 20 | 74 | 145 | 815 | .01 |
| 70 | 40 | 25 | 96 | 144 | 765 | .01 |

It is to be understood that the term "treating" as employed in the appended claims is used in a generic sense to include either the incorporation of the antioxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

This application is a continuation in part of my copending applications, Serial No. 455,473, filed May 24, 1930; Serial No. 284,886, filed June 12, 1928; and Serial No. 455,472, filed May 24, 1930.

The various examples hereinbefore set forth are to be understood as illustrative only and not limitative of the scope of the invention. Other compounding ingredients including accelerators and other proportions of ingredients than those indicated in the various examples may be employed in the manufacture of the various types of rubber products known to the art. It is intended that the patent shall cover, by suitable expression in the appended claims, whatever features of patentable novelty reside in the invention.

What I claim is:

1. A method of preserving rubber which comprises incorporating therein an N N' diaryl arylene diamine in which at least one of the aromatic radicals is of condensed polynuclear structure wherein rings which are directly connected by carbon atoms have two of such atoms common to each two of the rings so connected.

2. A method of preserving rubber which comprises treating the same with an N N' diaryl arylene diamine in which at least two of the aromatic radicals are of condensed polynuclear structure wherein rings which are directly connected by carbon atoms have two of such atoms common to each two of the rings so connected.

3. A method of preserving rubber which comprises incorporating therein an N N' diaryl arylene diamine in which two of the aromatic radicals are of condensed polynuclear structure wherein rings which are directly connected by carbon atoms have two of such atoms common to each two of the rings so connected.

4. A method of preserving rubber which comprises treating the same with an N N' diaryl arylene diamine in which each of the aromatic residues is of condensed polynuclear structure wherein rings which are directly connected by carbon atoms have two of such atoms common to each two of the rings so connected.

5. A method of preserving rubber which comprises treating the same with an N N' diaryl arylene diamine in which two of the aromatic radicals are of condensed polynuclear structure wherein rings which are directly connected by carbon atoms have two of such atoms common to each two of the rings so connected and the third is a mononuclear aryl hydrocarbon residue.

6. A method of preserving rubber which comprises treating the same with an N N' diaryl arylene diamine in which two of the aromatic radicals are of condensed polynuclear structure wherein rings which are directly connected by carbon atoms have two of such atoms common to each two of the rings so connected and the third is a phenyl residue.

7. A method of preserving rubber which comprises treating the same with an N N' diaryl phenylene diamine in which the two aryl groups are of condensed polynuclear structure wherein rings which are directly connected by carbon atoms have two such atoms common to each two of the rings so connected.

8. A method of preserving rubber which comprises treating the same with an N N' diaryl arylene diamine in which at least one of the aromatic radicals is a naphthyl residue.

9. A method of preserving rubber which comprises treating the same with an N N' diaryl arylene diamine in which at least two of the aromatic radicals are naphthyl residues.

10. A method of preserving rubber which comprises treating the same with an N N' dinaphthyl arylene diamine.

11. A method of preserving rubber which comprises treating the same with an N N' naphthyl aryl phenylene diamine.

12. A method of preserving rubber which comprises treating the same with an N N' diaryl arylene diamine in which two of the aromatic radicals are naphthyl residues and one is a phenyl residue.

13. A method of preserving rubber which comprises incorporating therein a material having the formula R—NH—$R_1$—NH—$R_2$, in which R and $R_2$ are naphthyl radicals and $R_1$ is a phenylene group.

14. A rubber product having incorporated therein an N N' diaryl arylene diamine in which at least one of the aromatic radicals is of condensed polynuclear structure wherein rings which are directly connected by carbon atoms have two of such atoms common to each two of the rings so connected.

15. A rubber product having incorporated therein an N N' diaryl arylene diamine in which at least one of the aromatic radicals is a naphthyl residue.

16. A rubber product having incorporated therein an N N' dinaphthyl arylene diamine.

17. A rubber product having incorporated therein a material having the formula
R—NH—$R_1$—NH—$R_2$
in which R and $R_2$ are naphthyl radicals and $R_1$ is a phenylene group.

18. A method of preserving rubber which comprises incorporating therein an N—N' diaryl arylene diamine in which two of the aromatic radicals include alkyl substituted phenyl groups.

19. A method of preserving rubber which comprises incorporating therein an N—N' diaryl arylene diamine in which one of the aromatic radicals is a naphthyl nucleous and the others are phenyl nuclei.

20. A method of preserving rubber which comprises incorporating therein an N—N' diaryl naphthylene diamine.

21. A method of preserving rubber which comprises incorporating therein an N—N' diphenyl naphthylene diamine.

22. A method of preserving rubber which comprises incorporating therein an N-aryl N' phenyl naphthylene diamine.

ALBERT M. CLIFFORD.